United States Patent
Benson et al.

(10) Patent No.: US 9,951,954 B2
(45) Date of Patent: Apr. 24, 2018

(54) LINER ASSEMBLY

(71) Applicant: ROLLS-ROYCE PLC, London (GB)

(72) Inventors: Christopher Benson, Derby (GB); Matthew Ashley Charles Hoyland, Chesterfield (GB)

(73) Assignee: ROLLS-ROYCE plc, London (GB)

( * ) Notice: Subject to any disclaimer, the term of this patent is extended or adjusted under 35 U.S.C. 154(b) by 163 days.

(21) Appl. No.: 14/640,640

(22) Filed: Mar. 6, 2015

(65) Prior Publication Data

US 2015/0276223 A1   Oct. 1, 2015

(30) Foreign Application Priority Data

Mar. 27, 2014   (GB) .................................. 1405496.9

(51) Int. Cl.
| | |
|---|---|
| F02C 7/04 | (2006.01) |
| F23R 3/00 | (2006.01) |
| F02K 3/00 | (2006.01) |
| F01D 25/24 | (2006.01) |
| F02K 3/06 | (2006.01) |

(Continued)

(52) U.S. Cl.
CPC .............. *F23R 3/002* (2013.01); *F01D 25/24* (2013.01); *F01D 25/243* (2013.01); *F01D 25/28* (2013.01); *F02C 7/04* (2013.01); *F02C 7/045* (2013.01); *F02C 7/24* (2013.01); *F02K 3/00* (2013.01); *F02K 3/06* (2013.01); *F04D 29/663* (2013.01); *F04D 29/664* (2013.01); *F04D 29/668* (2013.01); *F05D 2250/28* (2013.01); *F05D 2250/283* (2013.01); *F05D 2260/36* (2013.01); *F05D 2260/96* (2013.01); *F05D 2300/43* (2013.01); *F23R 2900/00017* (2013.01); *Y10T 29/49323* (2015.01)

(58) Field of Classification Search
CPC ......... F02K 3/00; F04D 29/663; F04D 29/664
See application file for complete search history.

(56) References Cited

U.S. PATENT DOCUMENTS

| | | | |
|---|---|---|---|
| 2004/0074239 A1 | 4/2004 | Tiemann | |
| 2005/0271505 A1* | 12/2005 | Alford | F01D 9/04 415/173.1 |

(Continued)

FOREIGN PATENT DOCUMENTS

| | | | |
|---|---|---|---|
| EP | 1 643 084 A1 | 4/2006 | |
| EP | 1 887 209 A2 | 2/2008 | |

(Continued)

OTHER PUBLICATIONS

Aug. 3, 2015 European Search Report issued in Application No. 15 15 7733.

(Continued)

*Primary Examiner* — Pascal M Bui Pho
*Assistant Examiner* — Kyle Thomas
(74) *Attorney, Agent, or Firm* — Oliff PLC

(57) ABSTRACT

A method of lining a turbofan casing (30) with an array (32) of liner modules (34), including the steps of: providing a liner module (34); and providing a coupling element (48) on the casing for interlocking engagement with the liner module to maintain the liner module in position relative to the casing; and interlockingly engaging the liner module (34) and coupling element (48) by progressive movement of the liner module relative to the coupling element.

16 Claims, 10 Drawing Sheets

(51) Int. Cl.
*F01D 25/28* (2006.01)
*F02C 7/045* (2006.01)
*F02C 7/24* (2006.01)
*F04D 29/66* (2006.01)

(56) References Cited

U.S. PATENT DOCUMENTS

| | | |
|---|---|---|
| 2007/0036644 A1 | 2/2007 | Harper |
| 2012/0168248 A1* | 7/2012 | Burak .................. F01D 25/162 |
| | | 181/292 |
| 2012/0224949 A1* | 9/2012 | Harper ................. F01D 21/045 |
| | | 415/9 |
| 2014/0212273 A1 | 7/2014 | Le Borgne |
| 2014/0234098 A1 | 8/2014 | Anderson et al. |

FOREIGN PATENT DOCUMENTS

| | | |
|---|---|---|
| EP | 2 105 597 A2 | 9/2009 |
| WO | 2012/164204 A1 | 12/2012 |
| WO | 2012/175850 A1 | 12/2012 |
| WO | 2014/105512 A1 | 7/2014 |

OTHER PUBLICATIONS

Sep. 30 Search Report issued in United Kingdom Application No. GB1405496.9.

* cited by examiner

I, T or J

Cylinder

Inverted

Cantilevered Rail

Supported

Radial bolted

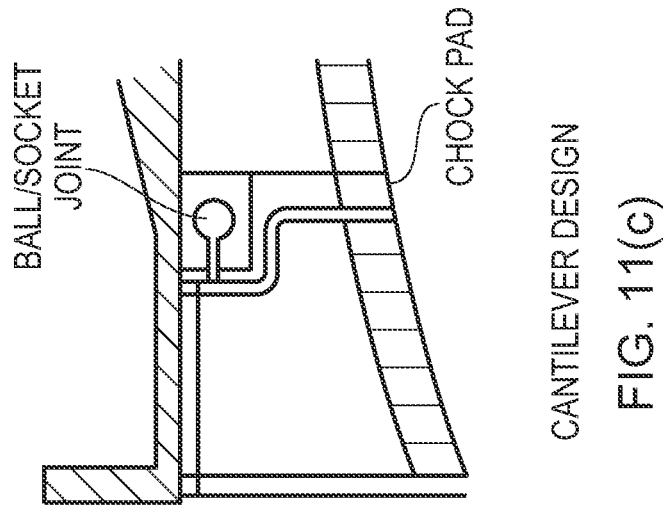
FIG. 11(c)
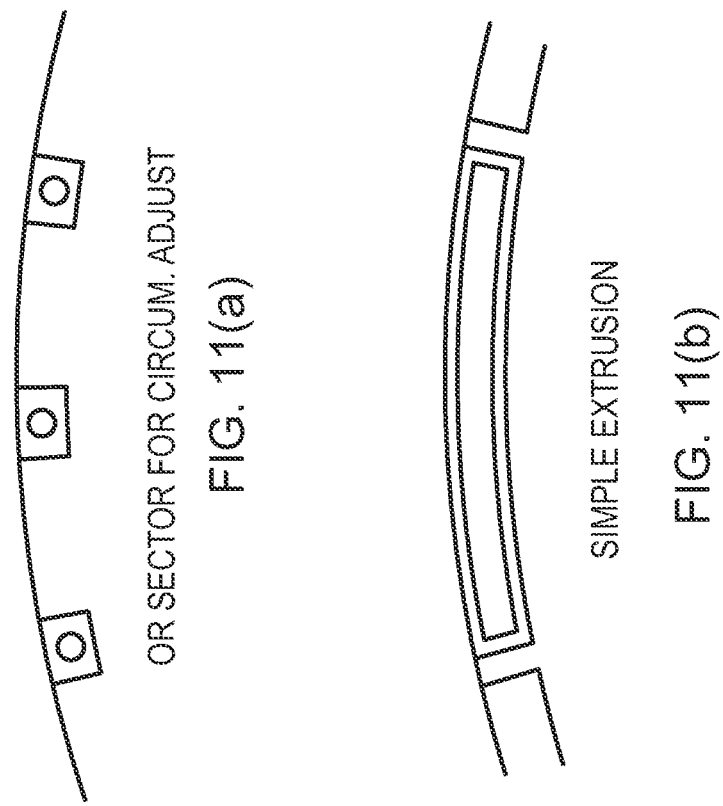
FIG. 11(a)
FIG. 11(b)

LINER ASSEMBLY

FIELD OF THE INVENTION

The present invention relates to a liner assembly for a turbomachine casing. In particular, but not exclusively the present invention relates to an acoustic damping liner assembly for the casing of a gas turbine engine.

BACKGROUND OF THE INVENTION

It is known to provide acoustic damping liner assemblies in casings for turbomachines, such as gas turbine engines, to reduce noise generated by the engine during operation. Typical assemblies consist of one or more acoustically resistive layers arranged radially inward (relative to the axis of rotation of the fan of the engine) of one or more acoustic damping honeycomb cavities. These liners are tuned to attenuate noise within a range of frequencies.

Typically, such acoustic liners are provided forward of the fan (i.e. upstream relative to the flow of the gas through the engine). The acoustic liners are typically provided as a circumferential assembly arranged around the inner surface of the fan casing. Each acoustic liner is typically referred to as a front acoustic panel or forward acoustic panel (FAP).

Conventionally, a FAP is made up of multiple components and materials, as shown in FIG. 1. For example, two partially circumferential compression moulded plastic rails 1, 1' arranged front and back (i.e. axially spaced apart) provide structural rigidity and a land for the mounting arrangement. The core 2 is formed aluminium honeycomb, bonded in, with drainage slots. The face 3 and backing 4 sheet are laminated glass fibre, epoxy resin composite (the face sheet is perforated to allow sound waves to enter the chamber).

On top of the backing sheet as shown (i.e. radially outward of the backing sheet relative to the axis of rotation of the fan), polysulphide 4 is combed into ribs to provide some assembly compliance and damping; the polysulphide effectively acts as a compliant shim.

These all bonded assemblies form 90 degree arcs around the inner circumference of the casing. Although, typically, the partially circumferential rails are only produced in 45 degree arcs due to manufacturing constraints, and thus are often joined to form 90 degree arcs using thick plastic straps across the joint. The respective rails 1, 1' are not directly connected to one another.

This results in 4 sub-assemblies per engine, collectively providing the fully circumferential assembly.

They are fitted into the fan casing, by removing the intake of the casing, by resting a rearward extension 5 of rail 1' on a lip 6 formed as part of the fan casing geometry. Typically, there is an O-ring 6' fitted into a groove on the lip 6 to provide assembly compliance and damping. Lip 6 provides a restraint against radial movement of the assembly. Lip 6 does not provide circumferential restraint.

The front region of the FAP is retained in place by multiple hook shaped metal brackets 7 arranged circumferentially around the fan casing. They are typically provided with bonded rubber cones 7', again for compliance and damping. The brackets sit in a recess 8 on the main flange and are bolted in place using counter sink screws 9 so they are flush with the main flange surface.

Another method of fitting these FAPs is to radially bolt them to the casing, which means they can be taken out with the intake still assembled. However, this requires a large circumferential gap between sections which is undesirable from an aerodynamic perspective.

As will be appreciated, the FAP itself is a complex assembly requiring multiple manufacturing processes and materials. It is therefore labour intensive and costly to manufacture.

The assembly method also requires multiple separate components thus adding time and cost to install. The case itself must have provision for these components which require extra machining processes, adding cost and lengthening production time of the case.

FAPs are designed to attenuate noise and require the exposed face area to be maximised. However, the structures required by the conventional assemblies take up valuable axial space. For example, if a radial bolted solution is used, the bolt support structures themselves can also take up noise 'real estate', and can additionally affect aerodynamic performance due to the discontinuities (bolt heads) in the respective annulus line of the engine.

SUMMARY OF THE INVENTION

Accordingly, the present invention preferably provides a liner assembly for lining a turbofan casing, the liner assembly including: a liner module; and a coupling element provided on the casing interlockingly engaged with the liner module to maintain the liner module in position relative to the casing; wherein the liner module is configured to be interlockingly engaged with the coupling element by movement of the liner module relative to the coupling element. Accordingly, assembling a liner assembly according to the present invention is simpler and quicker than the prior art assemblies, because movement of the liner module relative to the coupling element brings them into interlocking engagement such that the liner module is held in position relative to the casing by the coupling element.

The liner module may include a coupling portion suitably shaped for interlocking engagement with the coupling element. The interlocking engagement may be achieved by an interference fit between the coupling element and coupling portion. Thus, there may be no need for additional component parts to hold the liner module in place relative to the casing. Typically, it is not necessary to bolt the liner module to the casing, for example.

The coupling element and/or coupling portion may include a compliant member enabling the interference fit. The coupling element and the coupling portion may be formed respectively to include a projection and a complementary shaped recess for mutual interlocking engagement.

The coupling element may include an elongate rail having a long axis extending generally along the axis of the casing, and may be arranged to project generally radially inwards from the casing.

The liner module is preferably interlockingly engaged with the rail to be slidable along the rail. The rail is preferably curved. The rail may be arcuate. The rail or a portion thereof may form a partial helix.

A liner assembly according to the present invention may further include a plurality of the coupling elements arranged in series internally around the casing; and a plurality of the liner modules interlockingly engaged with the plurality of casing engagement elements.

The series of coupling elements is preferably rotationally symmetric about the axis of the casing. The plurality of liner modules preferably forms an array of liner modules lining the casing. The array may be generally circumferential. For example, the liner modules may be arranged generally circumferentially (internally) around the casing.

A respective coupling element is preferably provided between each circumferentially adjacent pair of liner modules. The coupling element provided between the circumferentially adjacent liner modules may be interlockingly engaged with each of the circumferentially adjacent liner modules.

The or each liner module may include an acoustic damping body. The or each liner module is preferably formed of an integral housing containing the acoustic damping body. The acoustic damping body may be integrally formed with the integral housing.

The present invention also provides a method of lining a turbofan casing with an array of liner modules, preferably including the steps of: providing a liner module; and providing a coupling element on (e.g. attached to) the casing for interlocking engagement with the liner module to maintain the liner module in position relative to the casing; and interlockingly engaging the liner module and coupling element by progressive movement of the liner module relative to the coupling element.

The coupling element may include an elongate rail having a long axis extending generally along the casing, and arranged to project generally inwards from the casing; wherein the method further includes the step of interlockingly engaging the liner module with the rail by progressively sliding the liner module along the rail.

The liner module may include a coupling portion suitably shaped for interlocking engagement with the coupling element; and wherein the coupling element and the coupling portion are respectively formed to include a projection and a complementary shaped recess for mutual interlocking engagement.

The liner module may include an elongate recess for receiving at least a portion of the elongate rail to be slidable along the rail. The elongate rail (48) may be curved. The elongate rails may be arcuate. The elongate rail (48) may form a partial helix.

The progressive movement of the liner module (34) to interlockingly engage the liner module and rail (48) corresponds to the curvature of the elongate rail. The movement of the liner module (34) to interlockingly engage the liner module and rail (48) may be correspondingly curved, arcuate or partially helical.

The method may further include the steps of: providing a plurality of the coupling elements (48) arranged in series internally around the casing and attached thereto; providing a plurality of the liner modules; and for each liner module, interlockingly engaging the liner module with a respective coupling element of the coupling elements, by progressive movement of the liner module relative to the respective coupling element.

The method may include the step of interlockingly engaging each liner module with a pair of circumferentially adjacent coupling elements to be located therebetween. The method may include the step of interlockingly engaging each liner module, of a pair of circumferentially adjacent liner modules, with the coupling element located between the pair of adjacent liner modules.

The method may include the step of arranging the liner modules in series to form a circumferential array lining the casing.

According to another aspect of the present invention a modular array of acoustic attenuation modules for lining a turbofan casing having a principal axis, wherein each acoustic attenuation module includes: module engagement means for cooperative engagement with casing engagement means to retain the module in place relative to the casing; a front wall located axially upstream of a back wall, each extending generally radially inward to at least partially define a space to contain an acoustic attenuator; and at least one side wall extending generally radially inward of the casing and connecting the front and back walls. Therefore, the acoustic liner modules of the present invention can be more efficiently installed, or fitted, to the turbomachine casing, thereby reducing labour time and associated costs.

Advantageously, therefore, acoustic liner modules according to the present invention can be manufactured more efficiently and less expensively by processes such as injection moulding or 3D printing. Furthermore, the modules can be formed of fewer materials, thereby reducing complexity and cost. Indeed, acoustic liner modules according to the present invention include fewer component parts than the prior art FAPs, and are thus more easily and quickly installed in the casing.

For example, for each module, the walls are preferably integrally formed. Indeed, for each module the at least one side wall preferably includes a pair of circumferentially spaced apart side walls, arranged to cooperate with the front and back walls to at least partially define the space. In each module the walls may support a radially inner cover sheet partially defining the space. Thus the space may be partially enclosed by the walls and the cover sheet. A backing sheet may be provided to enclose the space. The back sheet may be formed integrally with the walls. The walls and the cover sheet are preferably integrally formed.

Each module preferably includes an acoustic attenuator at least partially filling the space. The cover sheet is preferably perforated to put the space in fluid communication with the interior space of the casing. Thus, the acoustic noise to be attenuated is able to be guided to the acoustic attenuator to be attenuated or damped. Most preferably, the module is an integrally formed single body. In other words the module is preferably integrally formed of at least the four side walls, the acoustic attenuator and the cover sheet.

The module engagement means and the casing engagement means are preferably cooperatively engageable to lock the respective engagement means together, thereby preventing movement of the module in at least one dimension. For example, when locked, the module is preferably not movable radially outward or inward. The module engagement means and the casing engagement means are preferably cooperatively engageable to lock by relative movement of the module and casing engagement means. The module engagement means and the casing engagement means are preferably cooperatively engageable to be unlocked, for example by relative movement of the module and casing engagement means in the reverse direction.

The module engagement means and the casing engagement means are preferably provided with a projection receivable by a complementary shaped recess to lock the respective engagement means together, thereby preventing movement of the module in at least one dimension. The recess and/or the projection may include a compliant material, to enable the respective engagement means to lock. Suitable locking may be achieved by an interference fit.

Preferably, a respective casing engagement means is provided between each adjacent pair of modules. The module engagement means is preferably provided on each of the at least one side walls for engagement with the respective adjacent casing engagement means.

Each module, of a pair adjacent modules, preferably includes respective module engagement means shaped for complimentary engagement with the casing engagement means located between the pair of adjacent modules. The cooperative engagement of the module and casing engagements means may be configured to hold the module in place relative to the casing by an interference fit of the respective module and casing engagement means. Thus, preferably, the module engagement means and/or the casing engagement means includes a compliant element enabling the interference fit.

The casing engagement means preferably includes a series of mutually circumferentially spaced apart elongate rails arranged around an inner surface of the casing. Each rail preferably extends generally axially along the casing. The module engagement means of each module is preferably shaped for complimentary engagement with a respective elongate rail of the series so as to be slidable along the rail. The module engagement means may include an elongate recess for receiving at least a portion of the elongate rail to be slidable thereon. When the module is slid onto one or more rails, to cooperatively engage therewith, the module is not radially displaceable (relative to the axis of the casing).

Each elongate rail is preferably curved. For example, each elongate rail may extend generally along and around the axis of the casing. Each elongate rail may form a partial helix. The series of elongate rails is preferably rotationally symmetric about the axis of the casing. Preferably the degree of rotational symmetry of the elongate rails is equal to the number of elongate rails. The modular array preferably includes a circumferential array of the acoustic attenuator modules.

In an aspect, the present invention provides an acoustic attenuation module, of the modular array, as disclosed herein.

In an aspect, the present invention provides a turbomachine including a modular array, as disclosed herein, lining the turbofan casing of the turbomachine. The turbomachine is preferably a gas turbine engine.

The present invention also provides a method of manufacturing an acoustic attenuator module according to the present invention; the method may include the step of forming the acoustic attenuator module to be an integral body.

The present invention also provides a method of assembly of a modular array of acoustic attenuator modules for lining a turbofan casing, including the steps of: providing a circumferential series of casing engagement elements coupled to the casing; providing acoustic attenuator modules having module engagement means for cooperative engagement with the casing engagement elements, wherein cooperative engagement of the module engagement means and the casing engagement elements retains the module in place relative to the casing; cooperatively engaging the module engagement means with the casing elements by progressive movement of the module relative to the casing engagement elements.

The progressive movement may include a progressive axial movement of the module engagement means relative to the casing engagement elements. The progressive movement may include a progressive arcuate movement of the module engagement means relative to the casing engagement elements.

Each casing engagement element may include a respective elongate rail extending generally axially along the casing; and the module engagement means may be shaped for complimentary engagement with an elongate rail so as to be slidable along the rail, the step of cooperatively engaging the module engagement means with the casing elements may include the step of sliding the module along the elongate rail to be held in place thereby.

The module engagement means may include an elongate recess for receiving at least a portion of the elongate rail to be slidable along the rail. Each elongate rail may be curved to extend axially and circumferentially with respect to the axis of the casing. Thus, each elongate rail forms a partial helix, and the progressive movement may be helical.

Any feature of any aspect or embodiment is combinable with any other aspect or embodiment disclosed herein unless the combination is expressly forbidden or is understood by the skilled person to be technically impossible.

BRIEF DESCRIPTION OF THE DRAWINGS

Embodiments of the invention will now be described by way of example with reference to the accompanying drawings in which:

FIG. 11(a) shows an embodiment of the present invention;

FIG. 11(b) shows an embodiment of the present invention;

FIG. 11(c) shows a side cross-section of an embodiment of the present invention.

DETAILED DESCRIPTION AND FURTHER OPTIONAL FEATURES OF THE INVENTION

Figure 2:
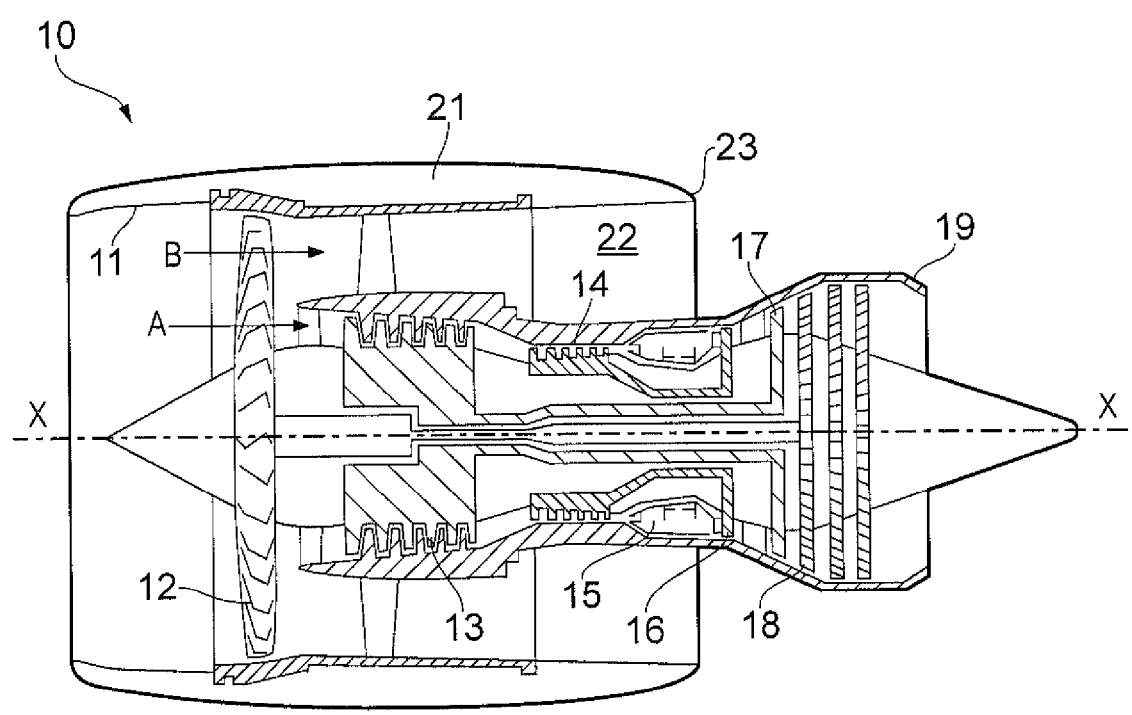
FIG. 2 shows a ducted fan gas turbine engine incorporating the present invention.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place. A fan casing is provided around the fan 12, the axis of the fan casing is coaxial with the axis X-X.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The forward or front acoustic panels (FAPs) are arranged circumferentially around the inner surface of the fan casing in the general region of the intake 11, upstream of the fan 12. FAPs are provided to attenuate the acoustic energy transmitted forward (i.e. upstream) from the fan 12.

The present inventors have realized that the prior art FAPs are overly complex and are expensive to manufacture and assemble, and therefore the present invention aims to provide a simpler, less expensive solution.

Accordingly, an aspect of the present invention provides a modular assembly of FAPs for installation in the casing of a turbomachine such as a gas turbine engine. Due to the modular nature of the FAPs according to the present invention, they are less expensive to manufacture and they are more easily fitted to the casing, thereby reducing the time and cost traditionally associated with the fitment of FAPs.

Figure 3:
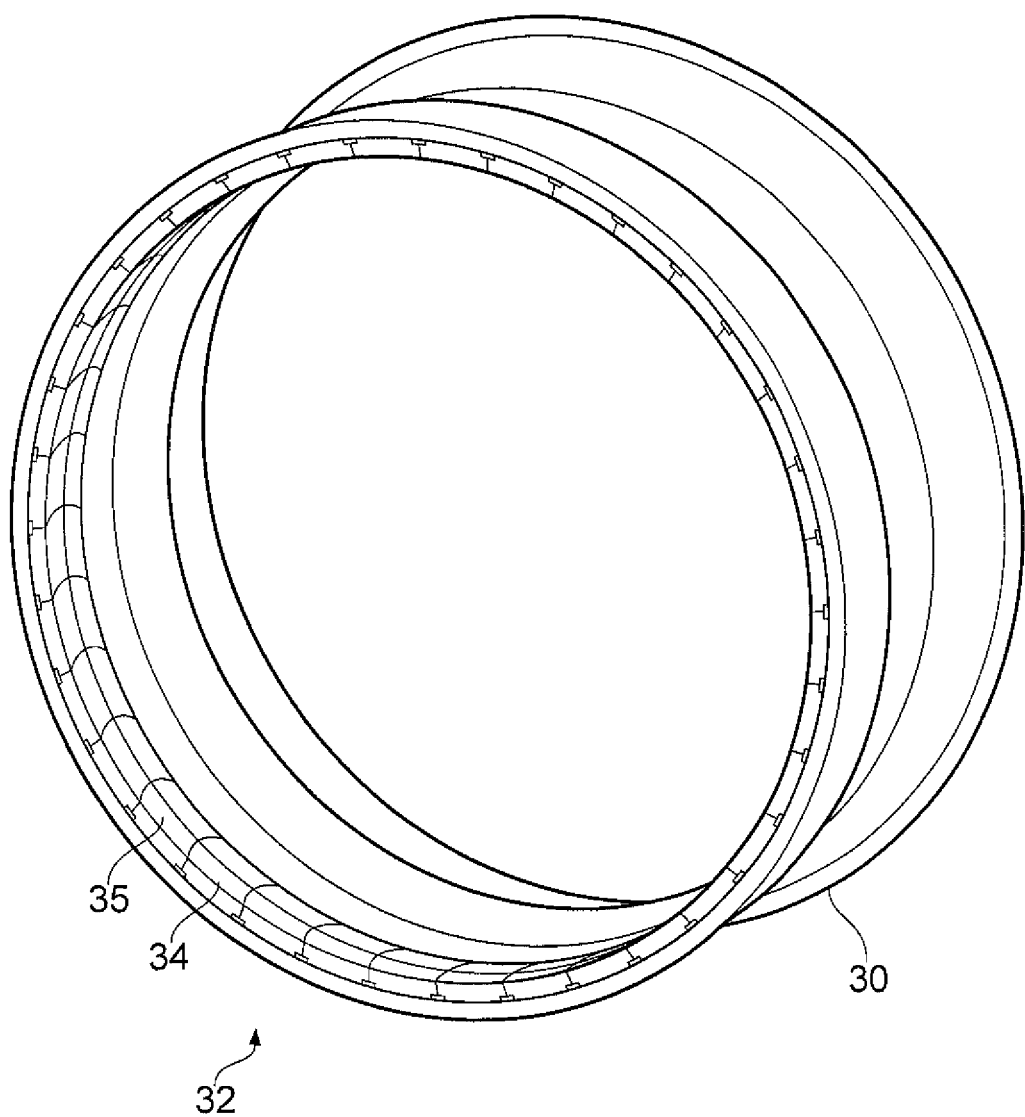
FIG. 3 shows an array of liner modules according to an embodiment of the present invention, installed in a circular section casing or duct.

For example, FIG. 3 shows a fan casing 30, with an annular or circumferential array 32 of acoustic liner modules 34 according to an embodiment of the present invention. Each module presents a radially inwardly facing surface 35, which may be perforated to permit acoustic waves to enter the module. Typically, the module will contain an acoustic attenuator or damper.

Figure 4:
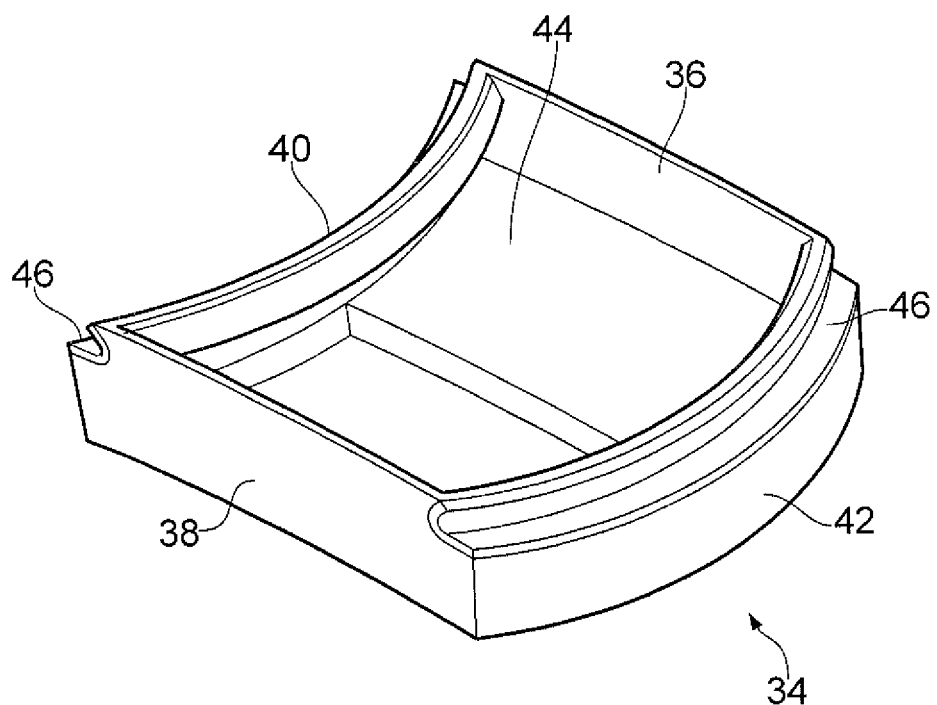
FIG. 4 shows a liner module according to an embodiment of the present invention.

According to this embodiment of the present invention, each module 34 is provided in the general form of a box as shown in FIG. 4. Module 34 has a back wall 36 and front wall 38 and two side walls 40, 42. Surface 35 is not visible in FIG. 4.

Walls 36, 38, 40, 42 and surface 35 are preferably formed as an integral body. This may be achieved by injection moulding, 3D printing or other additive manufacturing processes.

Walls 36, 38, 40 and 42 define a space for containing the acoustic damper. In the embodiment shown, the acoustic damper 44 is also formed integrally in the module. In other words, the acoustic damper 44 may be formed integrally with the walls, and with surface 35.

In the embodiment shown, acoustic liner module 34 is a single body. This permits the acoustic liner module 34 to be entirely manufactured by additive processes, such as injection moulding or 3D printing. It is therefore easier and less expensive to manufacture than the prior art FAPs. Furthermore, the modular nature of the acoustic liner module 34 make it simpler to install than the complex prior art assemblies, as each liner module 34 can be simply installed in place as a single unit. This is described below.

The acoustic damper 44 is shown in FIG. 4 at half height and is shown extending only half way between the front and back walls 36, 38. However, it is intended, of course, for acoustic damper 44 to extend between the walls and to possess sufficient height so as to be suitable for purpose. For example, acoustic damper 44 may fill the space defined by the walls. Depending on the application, the extension between the walls and the height of the acoustic damper 44 can be selected (e.g. tuned) suitably by the skilled person.

According to the present embodiment, each side wall 40, 42 includes a groove 46 along its length, the purpose of which will now be explained.

Figure 5:
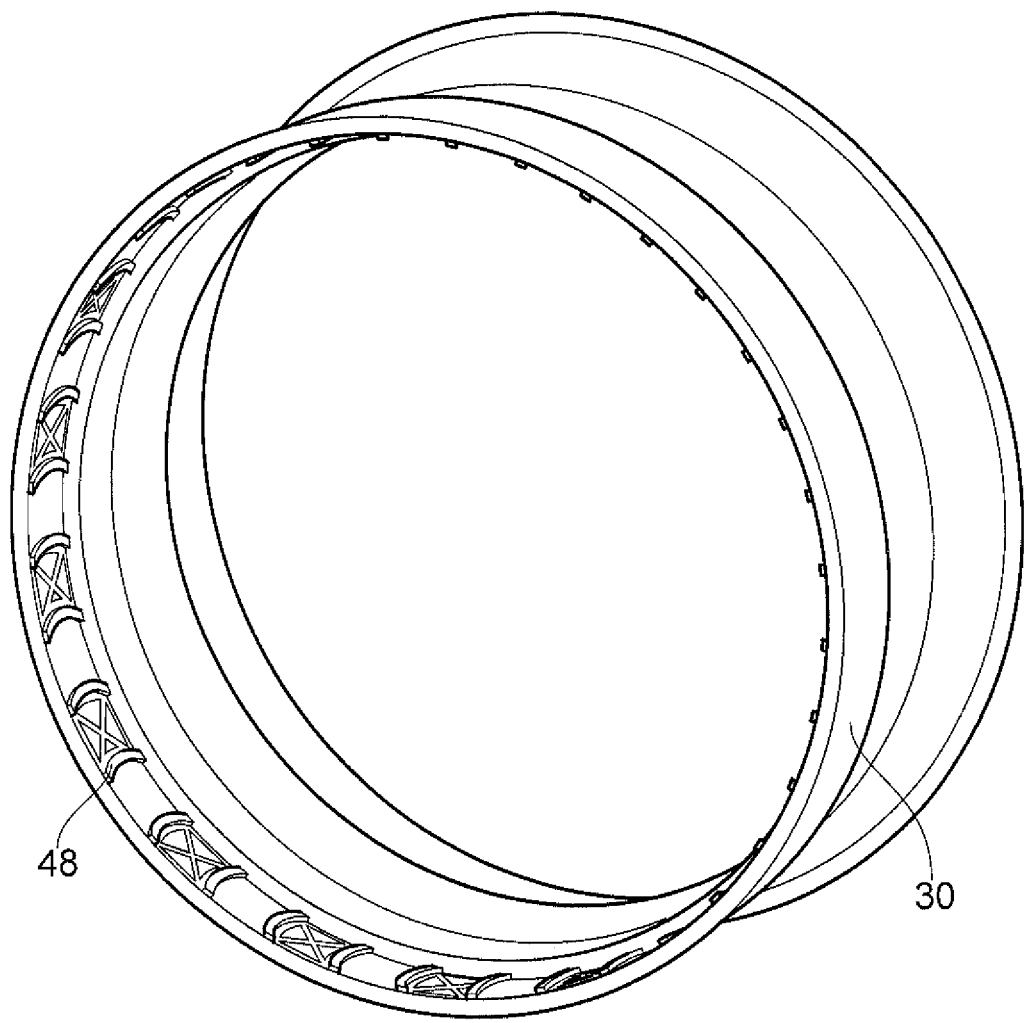
FIG. 5 shows a series of rails arranged to receive a plurality of liner modules and hold them in place in the circular section casing or duct in accordance with an embodiment of the present invention.

A series of respective rails 48 is provided circumferentially around the fan casing 30 as shown in e.g. FIG. 5. The rails are preferably provided equidistantly circumferentially around the casing 30. The rails are provided in series around the casing. The rails 48 are shaped for complimentary engagement with the grooves 46 in the sidewalls of the module 34. Typically, the rails 48 will be bonded to the casing 30.

The rails 48 extend along the casing, for example they extend generally axially along the fan casing. The rails 48 may also extend (at least) partly circumferentially around the fan casing 30.

The rails extend in unison, by which is meant they all preferably have the same shape and are positioned as a repeating series around the circumference of the fan casing. The rails 48 are preferably arranged in a circumferential series. The series is preferably symmetric about the axis of the fan casing. In other words, the series preferably displays rotational symmetry about the axis of the fan casing. Thus the rails 48 of the series preferably display rotational symmetry about the axis of the fan casing. In this sense, the rails 48 can be considered to extend in parallel.

A pair of circumferentially adjacent rails is provided for each module 34. Thus, the module 34 is locatable between the pair of circumferentially adjacent rails 48. The module preferably interlockingly engages with each of the rails 48.

For example, each rail of a pair of adjacent rails is receivable by a respective groove 46 of the pair of grooves formed in each module. By receipt of the rails in the grooves, the module 34 can thus be slid along the rails generally into the casing, e.g. generally in the axial direction, to be mounted or coupled to the casing 30.

The module 34 is typically held in place by an interference fit. To assist further with this, a compliant material is provided, e.g. as a coating, on the grooves and/or the rails. The coating therefore provides grip, damps vibration and will take up any tolerance stackups and misalignments, making for a robust assembly. The thickness of the coating (and therefore the level of interference fit between the module and rail) can be tuned to adjust the balance of grip, damping and ease of assembly.

The coating may be co-moulded with the module 34, or it may be bonded in after the module has been initially formed. The coating may be elastomer or a compliant plastic, for example. The coating may be referred to as an insert, provided in the grooves and/or on the rails. Advantageously, the (compliant) inserts will damp vibrations otherwise transmitted to the casing, thus improving fatigue properties of the individual component and the assembly as a whole.

Advantageously, the rails 48 take up very little volume, thus permitting the maximum amount of space in the assembly 32 to be used for acoustic attenuation.

It is desirable for there to be no gap between adjacent modules 34, so as to maximise the acoustic attenuation properties of the acoustic liner module assembly 32. In this regard, gaps between modules 34 is dead space, and does not contribute significantly to the attenuation properties of the assembly 32. Therefore, a pair of adjacent modules 34 preferably engages with a single rail provided between them, so that surfaces 35 of the respective modules are generally flush and adjoining. This configuration also makes for an intuitive and quick to install acoustic liner assembly.

The rails 48 are profiled to ensure positive location within the grooves 46 and to ensure sufficient restraint of the module 34, so as to prevent radial and circumferential movement of the module 34 (relative to the axis of the casing).

Preferably, multiple rails of the series are linked together via a location sheet 50 into arc sectors for easy location into a circular section duct or casing.

The location sheet 50 may form a completely circular arc. Such an arrangement, for location in a circular section duct or casing of the same diameter as the location sheet 50, would guarantee the correct spacing between adjacent rails 48. It also allows a larger array of modules to be bonded together, or a single box of a larger arc, to be installed at once, basically 'screwing' the assembly in along the axis of the casing. In other words, a module may be provided for interlocking engagement with more than two of the rails (e.g. the coupling elements). Depending on the size/arc length of the module 34, additional mid-rails 48 may be required, although this could be achieved by bonding two smaller boxes together such that the adjacent grooves of the bonded boxes are arranged to receive the mid-rail.

In the embodiment shown, a double rail is used—i.e. a location sheet 50 is provided to support a pair of rails—but any number of rails could be mounted on the location sheet 50. The location sheet 50 provides a large surface area for ease and strength of bonding onto the casing 30. The location sheet 50 can be weight optimised with weight reducing holes 52 whilst maintaining a rigid structure. The rails 48 and location sheet 50 can also be manufactured using injection moulding or other additive manufacturing processes. They can also be made out of similar plastics to the modules 34.

For installation, the rails and/or location sheet 50 are mounted on the internal surface of the casing, for example by bonding using a contact adhesive or similar, in an equidistant or equi-spaced, repetitive or cyclic pattern. Matching spacers may aid in accurate spacing of the rails relative to one another, when mounting or attaching the rails to the casing. Once the adhesive is cured, it is envisaged that the rails and location sheet 50 (if provided) will remain with the casing.

Figure 7:
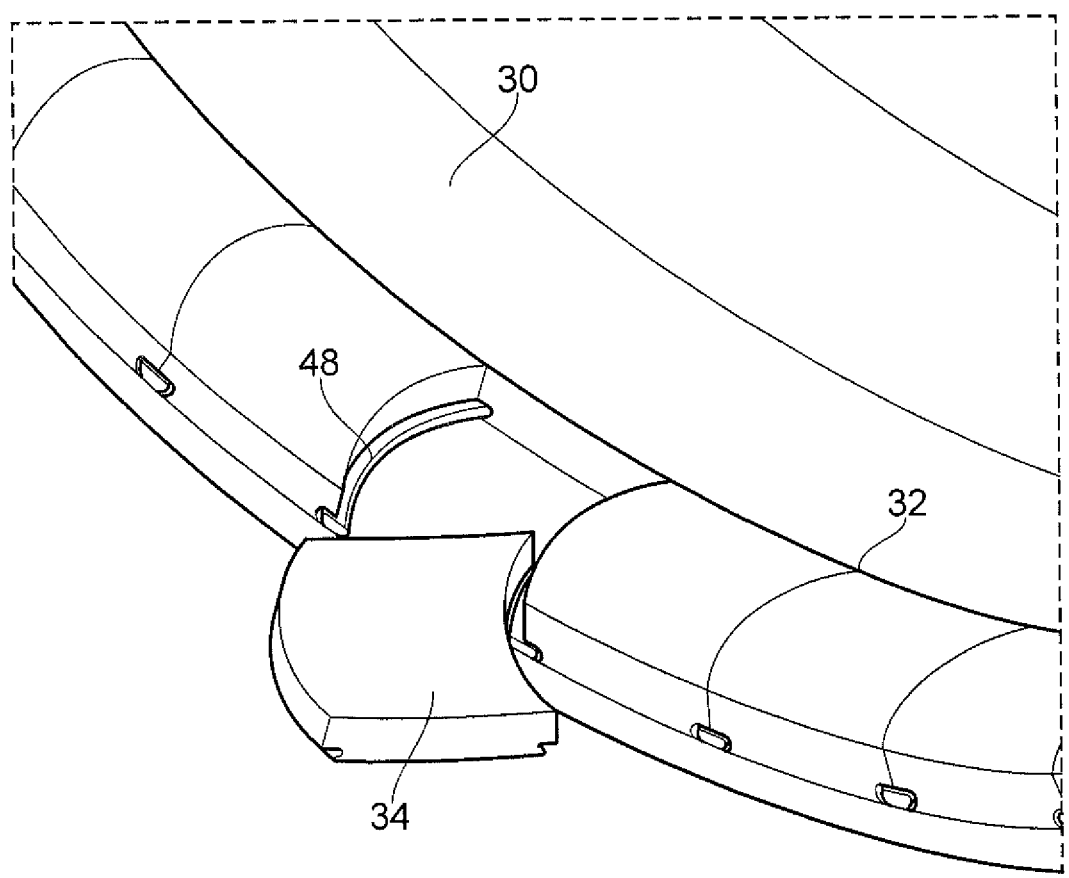
FIG. 7 shows the installation of a module according to the present invention.

The modules 34 are simply installed (or removed) by sliding them onto the rails, e.g. individually, for example as shown schematically in FIG. 7.

Although it is expected that the interference fit between the modules 34 and rails 48 will be sufficient to retain the modules in place, especially when the aforementioned coating or insert is provided, the rails and modules may optionally be curved (with respect to their long axes) to prevent unwanted axial movement of the modules (i.e. along the axis of the casing).

Figure 6:
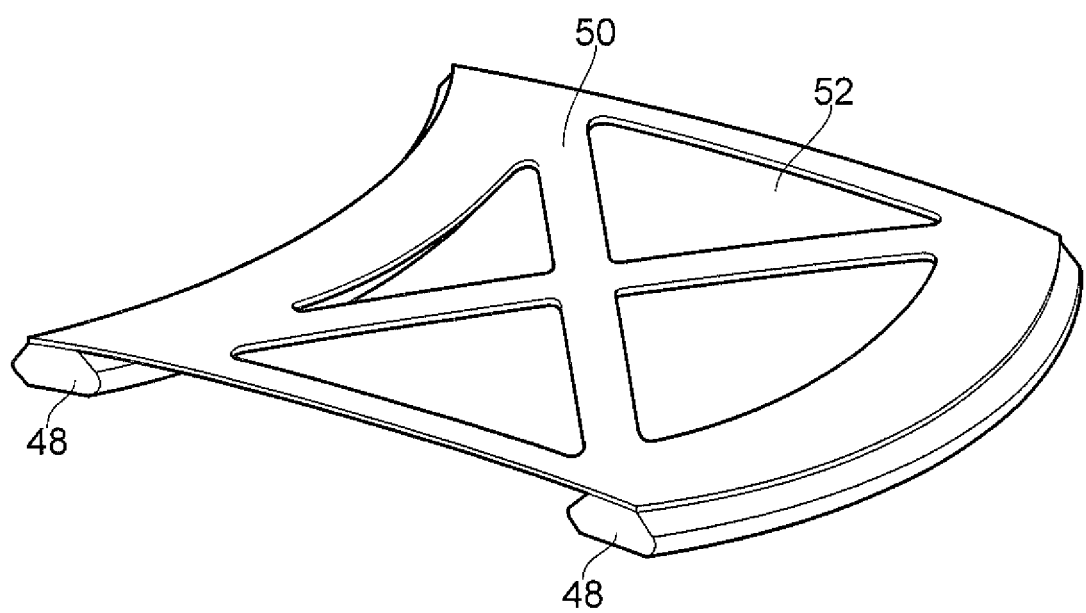
FIG. 6 shows a pair of rails according to an embodiment of the present invention.

Thus, as shown in FIG. 6, the elongate rails are typically curved. They may each form an arc, e.g. a circular arc. The rails may therefore be arcuate. In particular, the elongate rails 48 preferably conform to the (internal) surface of the casing on which they are mounted, and are additionally curved. For example, the rails may be described as curved rails, further shaped to conform to the (internal) surface of the casing. For example, the rails may be curved in three dimensions.

Because the rails extend generally axially along the casing, and curve in an arc to extend partly circumferentially around the axis of the casing, in embodiments the rails may be considered to be helical or partially helical.

Curvature of the rails in this way helps to prevent unwanted movement the liner modules generally along the axis of the casing.

The sidewalls, and grooves, of the modules 34 are correspondingly curved to conform to the curvature of the rails. Thus, the sidewalls, and grooves, may form an arc, e.g. a circular arc, for complementary engagement with the curved rails. The sidewalls may also therefore be arcuate. Indeed, in embodiment the sidewalls and grooves may be helical or partially helical. The curvature of respective and opposite sidewalls of each module 34 is preferably parallel.

Thus, when the modules are slid along the rails, the modules may be translated generally in the axial direction and rotated about a centre of origin common to the curvature of the rail. For example, to fit the curved module 34 to the curved rail 48, the module 34 is slid along rails to rotate about a centre of origin common to the curvature of both the sidewalls of the module 34 and the rails 48. Nevertheless, the module 34 can be considered to have moved along the axis of the casing.

This configuration prevents unwanted axial movement, and removes the need for additional restraints to be provided when the engine intake is off, e.g. during maintenance of the engine.

Typically, a liner module 34 is interlockingly engaged with the rails 48 by introducing an axially upstream end of a rail 48 into a groove 46, and progressively moving the liner module 34 relative to the casing 30 such that the liner module slides along the rail. Progressive movement of the liner module results in a progressive extent of the rail 48 being received into the groove 46.

Preferably, a respective rail 48 is introduced to each of the two grooves 46 provided on the liner module, such that the liner module is slidable along the pair of rails to interlockingly engage therewith.

As discussed above, where the rails are curved, the movement of the liner module includes a curving motion. For example, where the rails are arcuate, the movement of the liner module includes a corresponding arcuate motion, e.g. sliding motion, of the liner module along the rails. The motion may take place about an axis which is parallel to a radius of the axis of the casing.

Figure 1:
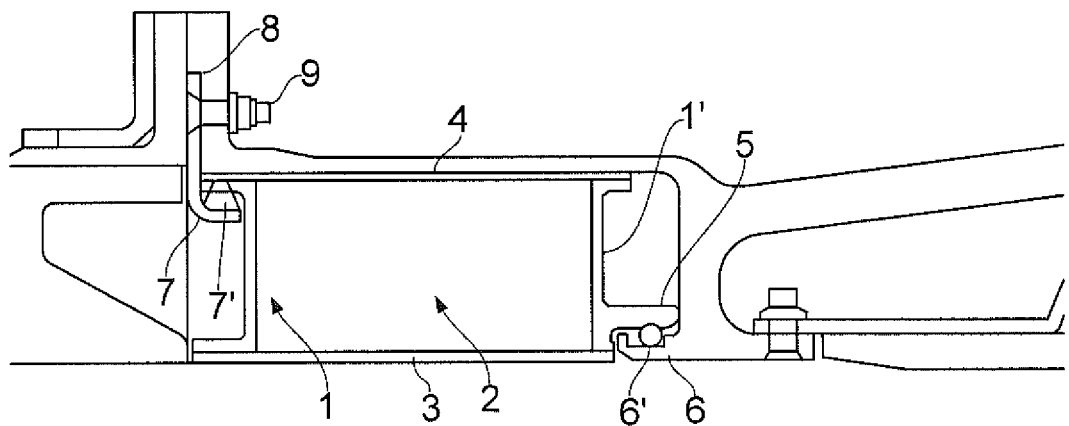
FIG. 1 shows a conventional FAP arrangement.

Depending on the fit selected between the rails and inserts, some force may be required to chock them in to place during installation. This can be achieved via a rubber mallet for instance. No other tools should be required. Thus, installation is vastly simplified compared with the prior art shown in e.g. FIG. 1.

This is shown by way of example in FIG. 7, which shows that the modules 34 can simply be slid along the rails to be located in place in the assembly (array), e.g. to be held in place by the aforementioned interference fit.

Accordingly, an aspect of the present invention proposes a one piece modular acoustic liner, for simple installation to e.g. the fan casing. The liner module may be formed as an integral single body, e.g. formed from an additive manufacturing process such as 3D printing or injection moulding. In a preferred embodiment, the modular acoustic liner is restrained via curved axial rails connected to the casing, mutually arranged in a cyclic pattern circumferentially around the casing and extending generally axially along the casing.

Each module may form an arc of the resulting assembly (array), which can be as large as the assembly method and manufacturing process will allow, permitting assembly of the respective arcs into a full circle when installed in the fan casing. Each module may be curved, e.g. in the axial direction, to match the rail shape and to provide a self-locking tessellated assembly, which is quick and easy to install.

The curvature of the rails can be varied to alter cost, axial retention or assembly processes. The simplest arrangement is straight, non-curved, rails arranged parallel to the axis of the casing. This arrangement may require additional restraint of the modules depending on the achievable strength of the interference fit. Rails angled to the axis of the casing would also be workable. Preferably, the rails are curved in a circular arc with varying degrees of curvature. For example, the rails are preferably curved in a partial helix.

In a preferred embodiment, each module has thick (e.g. >2 mm) front and back walls for rigidity, and relatively thin side walls (e.g. >1 mm) to minimise gaps between adjacent modules whilst maintaining rigidity. This arrangement leads to improved acoustic attenuation by presenting a greater surface area with acoustic damping properties than the prior art.

Typically, the acoustic attenuator or acoustic damper 44 is a honeycomb cell.

In embodiments, the acoustic damper 44 (the honeycomb cells) and perforated surface 35 are integrated into the moulding removing the need for separate materials and manufacturing processes whilst still maintaining the acoustic attenuation functionality, and stiffness capability of the conventional FAP designs.

However, in other embodiments, the acoustic damper 44 is not integral with the rest of the module 34. For example, the acoustic damper 44 may be fixed to, or bonded into, the module 34. Thus, in embodiments, the honeycomb cells may be fixed to, or bonded into, the module 34. As mentioned above, the honeycomb extent/profile within the module 34 can be varied depending on the noise/flutter and stiffness requirements. The extent of the acoustic damper 44, i.e. the honeycomb cell, can be varied or tuned in terms of height, width, length, cell density to alter the noise attenuation and stiffness/strength properties.

In embodiments, the box is open backed to allow the injection moulding tool to be removed—i.e. there is no surface (face) provided opposite the surface 35. However, by using other additive manufacturing techniques, the box could be closed backed.

Thus, a preferred embodiment provides a one piece injection moulded acoustic liner module with optional co-moulded elastomer inserts, simply installed and restrained via curved axial rails connected to the case and arranged in a cyclic pattern. Advantageously, the one piece module 34 and complementary rails reduces part count and simplifies installation.

The curvature and profile of the rails prevents axial and radial movement by forming an interlocking tessellated pattern assembly, removing the need for additional fasteners and restraining components. The elastomeric inserts provide compliance for misalignment, tolerance stack up, grip and vibration damping. The all in one design maximises space for noise attenuation.

Figure 8A:
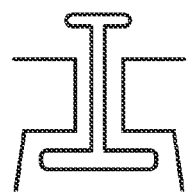
FIGS. 8(a), (b) and (c) show alternative arrangements of the rails and grooves forming aspects of the present invention.

The grooves 46 and rails 48 may be provided as a tongue and groove or a dovetail arrangement, as discussed above. However, the rail profiles could be different in order to alter the balance of location, grip, radial retention, ease of assembly, ease of manufacture etc. These could include, but not be limited to, T section, J section, cylindrical section, diamond, I beam etc. for locking engagement with a complementary elongate flange on the module 34 as shown in FIG. 8(a). It is even conceivable to invert the shape so the module provides runners for receipt by grooves formed in the rails.

Figure 8B:
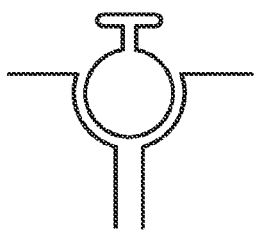

In another embodiment shown in FIG. 8(b), the rail may be provided in the form of an elongate cylinder, and the modules 34 may be provided with an elongate partially cylindrical recess of groove along which the cylinder is slidable. It is preferred that the partially cylindrical recess is suitably shaped to prevent radial movement of the module 34 (relative to the axis of the casing 30), i.e. to prevent the module 34 from detaching from the rail other than by sliding the module 34 off the rail along the long axis of the rail.

Figure 8C:
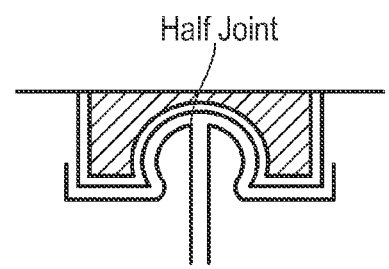

In another embodiment shown in FIG. 8(c), the rail may be shaped to provide an elongate partially cylindrical recess, and the modules 34 may be provided with an elongate partially cylindrical projection to be received by the elongate partially cylindrical recess. Preferably, the partially cylindrical projections of adjacent modules are receivable by the partially cylindrical recess. The pair of partially cylindrical projections cooperate to form a locking engagement with the partially cylindrical recess. It is preferred that the partially cylindrical recess is suitably shaped to prevent radial movement of the modules 34 (relative to the axis of the casing 30), i.e. to prevent the modules 34 from detaching from the rail other than by sliding the modules 34 off the rail along the long axis of the rail.

To simplify the assembly 32 and its manufacture further, the (elastomer) inserts could be integrated with the rails, as mentioned above. The entire rail may itself be made out of the compliant material (e.g. compliant plastic or elastomer), reducing/simplifying processes and part count further whilst still maintaining functionality. The rail could then be a simple cheap extrusion cut to length and bonded in.

In preferred embodiments of the invention the rails and/or location sheet 50 are bonded to the casing 30. However, other embodiments may employ additional or alternative means to couple the rails and/or location sheet to the casing.

Figure 9A:
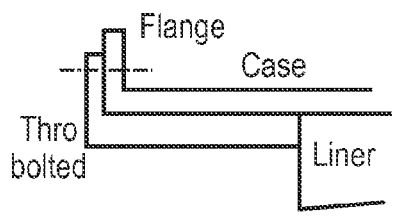
FIGS. 9(a), (b) and (c) shows alternative arrangements of coupling or mounting the rails to the casing or duct in other aspects of the present invention.

For example, in FIG. 9(a) an embodiment is shown in which the rail and/or location sheet 50 extends radially outward of the casing 30, together with a flange of casing 30. The rail and/or location sheet 50 is bolted through the flange to hold the rail in place. The rail may therefore be considered to be cantilevered.

Figure 9B:
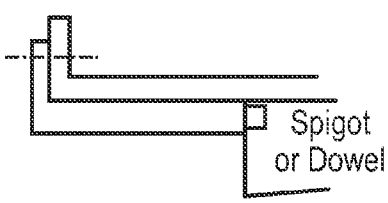

In addition to the bolt, as shown in FIG. 9(b) a spigot or dowel may be provided at the end of the rail and/or location sheet distal to the bolted end, for receipt into another part of the casing 30 or into another component of the overall turbomachine.

Figure 9C:
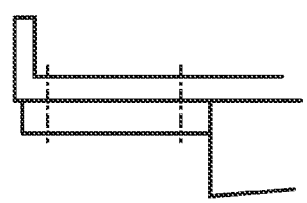

In another embodiment, shown in FIG. 9(c), the rail and/or location sheet 50 may be radially bolted to the casing.

In each of the alternative embodiments above bonding may additionally be used to secure the rails and/or location sheet to the casing.

The modules 34 and rails 48 could be formed of plastic or metals, depending on cost/weight trades. Additive manufacture and even injection moulding is achievable with metals. The rail form and material combined with the case material would affect the choice of bonded vs bolted assembly. Other plastics for consideration include but are not limited to Polyamides (e.g. Stanyl), Polycarbonate, Polyoxymethylene (e.g. Delrin), Thermoplastic Polyester (e.g. PBT), Liquid crystal polymer (e.g. Vectra). However, most preferably, the module is formed of PPS (Polyphenylene sulphide) for a good balance of weight, stiffness, strength, high temperature capability, chemical resistance and moisture absorption.

Figure 10:
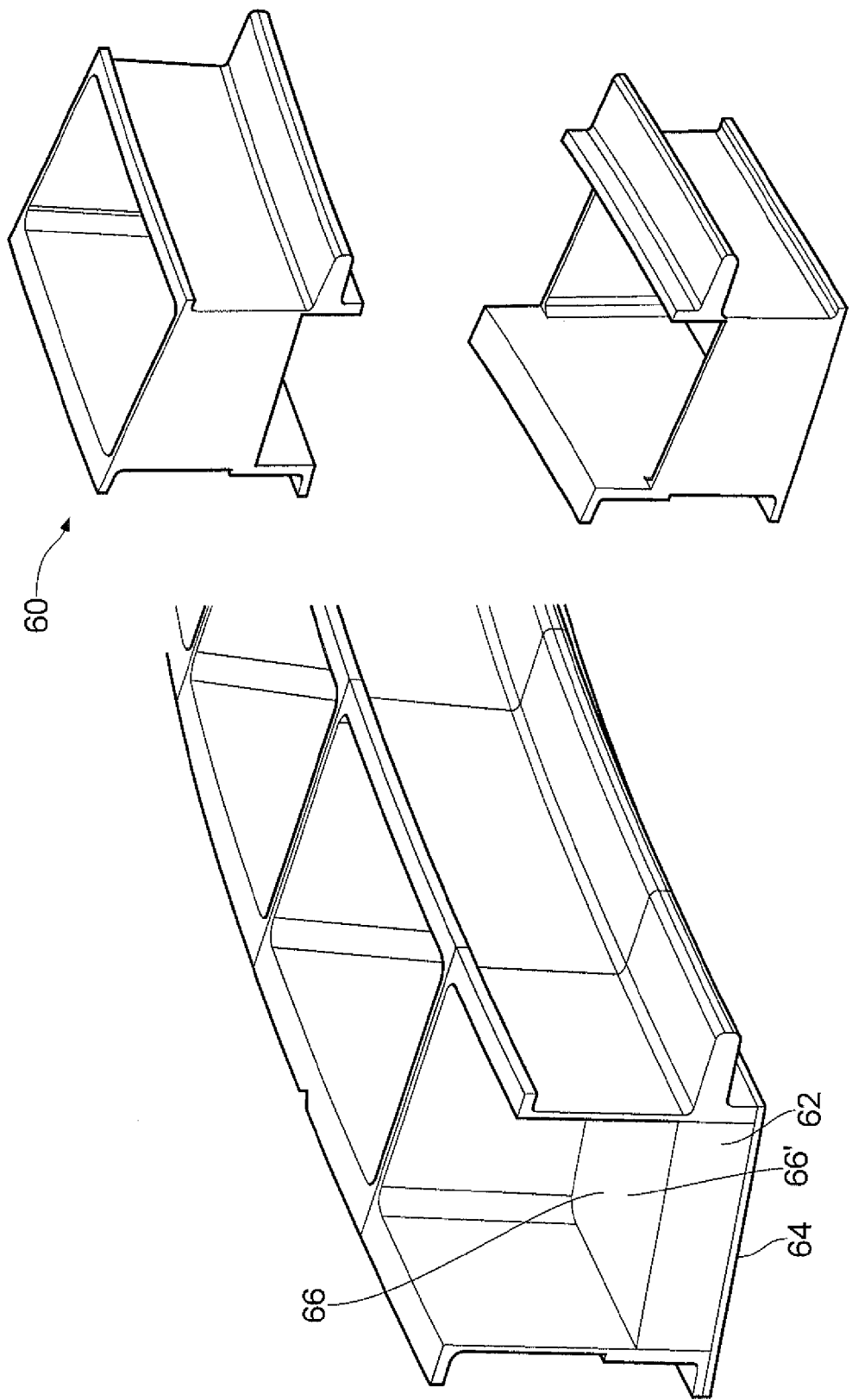
FIG. 10 shows an embodiment of the present invention.

Another embodiment is more closely related to the existing conventional design and installation method, but uses injection moulding to form the box of the module 34 to simplify and reduce costs. As shown in FIG. 10, a modular box 60 is formed. A plurality of boxes can be coupled in series to form an arc. A plurality of such boxes would, externally, resemble the pair of partially circumferential rails shown in e.g. FIG. 1. However, unlike the prior art arrangement in FIG. 1 side walls or end faces are present in the arc formed from modular boxes 60 (the end face or side wall is absent in FIG. 10(a) simply to reveal the aluminium honeycomb acoustic damper).

In the modular boxes 60, the front and back walls are taller than each of the two side walls. Thus, an arcuate acoustic damper 62 (e.g. aluminium honeycomb) is a body separable from the modular boxes 60 that extends across a plurality of the modular boxes 60. The acoustic damper may be bonded in place.

For example, although a plurality of boxes 60 may be coupled to together to form a partial arc, for example a 90° arc, of the modular assembly The arcuate acoustic damper 62 may be an integral body extending over the 90° arc.

Face sheet 64 may also be a body separable from the modular boxes 60. Face sheet 64 may also extend around a 90° arc, to span the plurality of modular boxes. The face sheet 64 may be bonded in place.

In other embodiments, the face sheet and/or honeycomb could be integrated with the modular box 60. The acoustic damper 62 and/or face sheet 64 may be formed integrally with the modular box. Thus, the acoustic damper 62 and/or face sheet may not be provided as a single integral body which spans an arc greater than the arc spanned by the modular box.

In embodiments, a back sheet 66 is provided adjacent the acoustic damper 44. Backing sheet 66 is preferably provided to extend in an arc to match arcwise extension of the acoustic damper. However, back sheet 66 may be provided as a series of modular back sheets 66', providing only a partial arcwise extension along the arc length of the acoustic damper 62. Nevertheless, in any event, the individual boxes and back sheets 66' can be bonded together into larger arc sectors, e.g. to match the arcwise extension of the acoustic damper 62.

Relative to the prior art, this embodiment advantageously allows inexpensive additive manufacture techniques to be used to form the modular boxes 60 which can be arranged and combined to be installed in existing fan casings in the conventional way, for example.

In yet another embodiment, shown in FIG. 11, the rails are replaced by compliant sockets so that the boxes (liner modules) are simply 'popped' into place by axial movement of the box to insert, or interlockingly engage, a bulbous portion projecting from the box into a socket. For example, each box may include a projecting member having a bulbous portion for insertion into one of the complimentary shaped compliant sockets to be retained thereby. The bulbous portion may be generally spherical for example. Again the compliance could be tuned to adjust the holding and damping attributes.

For example, a circumferential array of sockets may be attached to the casing, e.g. to the axially neighbouring casing liner. A liner module, or box, may be installed as a cantilever as shown in FIG. 11(c), by popping the suitably shaped projection into the socket. This arrangement may benefit from a chock pad to help remove any 'looseness' in the assembly.

Instead of a circumferential array of discrete sockets, the concept could also be embodied by radially separated circumferential rails (partial or full), thus allowing for easy circumferential adjustment and reducing the rails to simple extrusions. The circumferential rails may be attached to the case (either bolted or bonded), and one or more gaps or 'key holes' could be provided to allow assembly of the array of the individual boxes 60. For example, a suitably shaped key hole may be provided such that the projecting member of each box is insertable into the key hole. By moving the box circumferentially around the casing via the rails, the projection is retained and guided by the rails. As the projection preferably includes the bulbous portion distal to the box, the radial separation of the rails is selected to prevent the projecting member from moving axially within the casing, by preventing the bulbous portion from passing between the rails. Whereas, the key hole preferably provides a suitably dimensioned aperture to allow the bulbous portion to pass therethrough, thereby allowing the box to be withdrawn from the casing.

This may even allow installation with the fan casing intake still in place i.e. 'on-wing'.

In another aspect, modules 34 of respectively varying heights may be arranged circumferentially around the casing, and thus an asymmetric section fan casing aperture can be provided. This may be referred to as an asymmetric aeroline surface for example. The acoustic liner assembly 32 may be arranged to be asymmetric about the axis of the casing. By virtue of the additive manufacturing processes used to make modules 34 according to the present invention, it is easier to provide such an assembly by use of the present invention than by using the prior art.

The present invention provides an assembly which is easier to assemble than the prior art and which provides integrity of axial/radial positioning and retention along robust misalignment tolerances. Thus, the present invention is particularly suited to providing a liner assembly for lining the casing of a turbomachine, for example a gas turbine engine. In particular, the present invention is particularly suited to providing an assembly of forward acoustic panels for lining the casing of a turbomachine, in particular a gas turbine engine. However, the present invention is not so limited. The present invention is also suitable for providing a liner assembly for any structure in which liner modules are required to be arranged in cyclic symmetry, e.g. around a rotational axis. For example, the present invention is applicable to gas turbine engine RAPs, impact liners, fan track liners, outlet guide vane infill panels etc. It could even be applied to the installation of larger components such as fan case accessories.

The invention claimed is:

1. A liner assembly for lining a fan casing of a turbofan, the liner assembly comprising:
  a liner module, the liner module comprising (i) a front wall oriented toward a front of the fan casing, (ii) a rear wall oriented toward a rear of the fan casing, (iii) an arcuate first side wall that extends between the front wall and the rear wall, and (iv) an arcuate second side wall that extends between the front wall and the rear wall, the arcuate second side wall having a curvature matching a curvature of the arcuate first side wall, wherein the respective curvature of the first and second arcuate sidewalls is such that the first and second arcuate sidewalls extend partly in the circumferential direction with respect to a longitudinal axis of the fan casing; and
  a coupling element provided on the fan casing interlockingly engaged with the liner module to maintain the liner module in position relative to the fan casing, the coupling element comprising an arcuate elongate rail arranged to project radially inwards from the fan casing, the arcuate elongate rail curving such that the arcuate elongate rail follows the respective curvature of the first and second arcuate side walls;

wherein the liner module is configured to be interlockingly engaged with the arcuate elongate rail by sliding movement of the liner module along the arcuate elongate rail.

2. The liner assembly according to claim 1, wherein the liner module further comprises a coupling portion suitably shaped for interlocking engagement with the arcuate elongate rail.

3. The liner assembly according to claim 2, wherein the interlocking engagement between the rail and the coupling portion is achieved by an interference fit wherein the rail and the coupling portion are formed respectively to include a projection and a complementary shaped recess for mutual interlocking engagement.

4. The liner assembly according to claim 1, wherein the arcuate elongate rail comprises a plurality of the arcuate elongate rails arranged in series internally around the fan casing; and the liner module comprises a plurality of the liner modules interlockingly engaged with the plurality of the arcuate elongate rails.

5. The liner assembly according to claim 4, wherein a respective one of the arcuate elongate rails is provided between each circumferentially adjacent pair of the liner modules.

6. The liner assembly according to claim 1, wherein the liner module further comprises an acoustic damping body.

7. The liner assembly according to claim 6, wherein the liner module is formed of an integral housing containing the acoustic damping body.

8. The liner assembly according to claim 7, wherein the acoustic damping body is integrally formed with the integral housing.

9. A method of lining a fan casing of a turbofan, comprising the steps of:

providing a liner module, the liner module comprising (i) a front wall oriented toward a front of the fan casing, (ii) a rear wall oriented toward a rear of the fan casing, (iii) an arcuate first side wall that extends between the front wall and the rear wall, and (iv) an arcuate second side wall that extends between the front wall and the rear wall, the arcuate second side wall having a curvature matching a curvature of the arcuate first side wall, wherein the respective curvature of the first and second arcuate sidewalls is such that the first and second arcuate side walls extend partly in the circumferential direction with respect to a longitudinal axis of the fan casing; and providing a coupling element on the fan casing for interlocking engagement with the liner module to maintain the liner module in position relative to the fan casing, the coupling element comprising an arcuate elongate rail arranged to project inwards from the fan casing, the arcuate elongate rail curving such that the arcuate elongate rail follows the respective curvature of the first and second arcuate side walls, and the liner module further comprising an elongate recess for receiving at least a portion of the arcuate elongate rail such that the liner module is slidable along the arcuate elongate rail; and interlockingly engaging the liner module and the arcuate elongate rail by progressive sliding of the liner module along the arcuate elongate rail.

10. The method of lining the fan casing of the turbofan according to claim 9, wherein the liner module further comprises a coupling portion suitably shaped for interlocking engagement with the rail; and wherein the rail and the coupling portion are respectively formed to include a projection and a complementary shaped recess for mutual interlocking engagement.

11. The method of lining the fan casing of the turbofan according to claim 9, wherein a progressive movement of the liner module to interlockingly engage the liner module and the arcuate elongate rail corresponds to the curvature of the arcuate elongate rail.

12. The method of lining the fan casing of the turbofan according claim 9, further comprising the steps of:

providing a plurality of the arcuate elongate rails attached to the fan casing and arranged in series internally around the fan casing;

providing a plurality of the liner modules; and for each liner module, interlockingly engaging the liner module with a respective one of the arcuate elongate rails, by progressive movement of the liner module relative to the respective rail.

13. The method of lining the fan casing of the turbofan according to claim 12, wherein the method further comprises the step of interlockingly engaging each liner module with a pair of circumferentially adjacent arcuate elongate rails of the plurality of arcuate elongate rails to be located therebetween.

14. A fan casing of a turbofan configured to surround a propulsive fan, the fan casing comprising:

a liner assembly for lining the fan casing at a position upstream of a position corresponding to the propulsive fan, the liner assembly comprising:

a liner module, wherein the liner module comprises an acoustic damping body, (i) a front wall oriented toward a front of the fan casing, (ii) a rear wall oriented toward a rear of the fan casing, (iii) an arcuate first side wall that extends between the front wall and the rear wall, and (iv) an arcuate second side wall that extends between the front wall and the rear wall, the arcuate second side wall having a curvature matching a curvature of the first side wall, wherein the respective curvature of the first and second arcuate sidewalls is such that the first and second arcuate side walls extend partly in the circumferential direction with respect to a longitudinal axis of the fan casing; and a coupling element provided on the fan casing interlockingly engaged with the liner module to maintain the liner module in position relative to the fan casing; wherein the liner module is configured to be interlockingly engaged with the coupling element by movement of the liner module relative to the coupling element.

15. The liner assembly according to claim 14, wherein the liner module is formed of an integral housing containing the acoustic damping body.

16. The liner assembly according to claim 15, wherein the acoustic damping body is integrally formed with the integral housing.

* * * * *